United States Patent
Arrol et al.

(10) Patent No.: US 7,622,093 B2
(45) Date of Patent: Nov. 24, 2009

(54) METHOD FOR ZONAL INJECTION OF CHEMICALS INTO A FURNACE CONVECTIVE PASS TO REDUCE POLLUTANTS FROM FLUE GASES

(75) Inventors: Stuart Arrol, Glasgow (GB); Peter Melling, Renfrewshire (GB); George Anthony Yates, Kent (GB); Michael J. Smith, Roswell (GB); Gerard J. W. C. Hesselmann, Johnstone (GB); Barbara Lefebvre, Smyrna, GA (US); John Macphail, Erskine (GB); Keith W. Morris, Alpharetta, GA (US)

(73) Assignee: Doosan Babcock Energy America LLC, Atlanta, GA (US)

( * ) Notice: Subject to any disclaimer, the term of this patent is extended or adjusted under 35 U.S.C. 154(b) by 0 days.

(21) Appl. No.: 12/260,360

(22) Filed: Oct. 29, 2008

(65) Prior Publication Data
US 2009/0047199 A1    Feb. 19, 2009

Related U.S. Application Data

(62) Division of application No. 10/850,447, filed on May 21, 2004, now abandoned.

(60) Provisional application No. 60/472,431, filed on May 22, 2003.

(51) Int. Cl.
*B01D 53/38*    (2006.01)
*B01D 53/50*    (2006.01)
*B01D 53/56*    (2006.01)

(52) U.S. Cl. .................. 423/210; 423/235; 423/243.01; 423/243.06; 423/DIG. 5

(58) Field of Classification Search ................. 423/210, 423/235, 243.01, 243.06, DIG. 5; 422/105, 422/108, 111
See application file for complete search history.

(56) References Cited

U.S. PATENT DOCUMENTS

| | | | | |
|---|---|---|---|---|
| 4,115,515 A * | 9/1978 | Tenner et al. | ............... | 423/235 |
| 4,915,036 A * | 4/1990 | DeVita | ....................... | 110/215 |
| 4,950,473 A * | 8/1990 | Flockenhaus et al. | ........ | 423/235 |
| 5,536,482 A * | 7/1996 | Diep et al. | ................... | 423/235 |
| 5,555,718 A * | 9/1996 | Anderson et al. | ............. | 60/783 |
| 5,567,226 A * | 10/1996 | Lookman et al. | ................. | 95/3 |
| 7,166,262 B2 * | 1/2007 | Buzanowski | ............. | 423/239.1 |
| 2004/0057888 A1 * | 3/2004 | Buzanowski | ................ | 423/235 |
| 2004/0057889 A1 * | 3/2004 | Buzanowski | ................ | 423/235 |
| 2008/0202397 A1 * | 8/2008 | Torbov et al. | ............... | 110/345 |

* cited by examiner

Primary Examiner—Timothy C Vanoy (57) ABSTRACT

Zonal injection of varying compositions of chemicals, particularly an ammonia-based reagent and hydrocarbon, through injection lances arranged in a grid formation to define planar zones in a furnace convective pass of a furnace. The supply of chemicals is controlled so as to be individually determined for each discrete zone of the grid depending on conditions in that zone.

4 Claims, 10 Drawing Sheets

FLUE GAS FLOW

METHOD FOR ZONAL INJECTION OF CHEMICALS INTO A FURNACE CONVECTIVE PASS TO REDUCE POLLUTANTS FROM FLUE GASES

CROSS REFERENCE TO RELATED PATENT APPLICATIONS

This application is a divisional of U.S. patent application Ser. No. 10/850,447 filed May 21, 2004, now abandoned, which claims priority from prior provisional patent application Ser. No. 60/472,431 filed May 22, 2003, the entire disclosures of which are incorporated herein by reference.

BACKGROUND OF THE INVENTION

1. Field of the Invention

The present invention relates to a method and apparatus for injection of chemicals, particularly ammonia-based reagents and hydrocarbons, into the convective pass of a coal, oil or gas fired furnace/boiler to reduce pollutants, such as $NO_x$ and mercury, in the furnace/boiler flue gases.

2. Brief Description of the Related Art

Power generator exhaust or flue gases present a major source of air pollutants, such as nitrogen and sulfur oxides and mercury which contribute to a number of environmental problems. Photochemical smog is formed when $NO_2$ undergoes a series of reactions in the presence of sunlight and airborne hydrocarbons. The consequences of photochemical smog are harm to human health, degradation of many materials, and reduced yield of crops in agriculture. $NO_x$ also reacts with the water in the atmosphere to form nitrous and nitric acids. Acid rain has been associated with the deterioration of buildings and statues made of granite, limestone and marble. Another consequence of acid rain is its effect on aquatic life. Typical pH levels in lakes and streams located in regions liable to acid rain have dropped from a neutral 7 to a weakly acidic 4.

$NO_x$ is formed during combustion processes. There are two mechanisms for the formation of $NO_x$. "Fuel" $NO_x$ is a result of the oxidation of the nitrogen chemically bound in the fuel during the burning process. "Thermal" $NO_x$ is formed in the high temperature combustion zone of a boiler when the molecular species of nitrogen and oxygen within the combustion air react to form $NO_x$.

Combustion modification technologies, such as low $NO_x$ burners, over-fire air and staged combustion, all limit the formation of "fuel" $NO_x$ by reducing the amount of oxygen present during the period in which the nitrogen species are being evolved from the fuel matrix. By reducing the overall within the combustion zone the "Thermal" $NO_x$ can also be reduced.

The technologies mentioned above are all capable of achieving upwards of 50% $NO_x$ reduction; however, tightening pollution control legislation requires upwards of 80% reduction. It is, hence, now necessary for coal, gas and oil fired boilers to utilize some sort of effluent gas cleanup system.

Gas clean-up technology to date can be classified into two main groups: selective catalytic reduction (SCR) and selective non-catalytic reduction (SNCR). $NO_x$ is reduced to water and nitrogen in both processes. The most common form of SCR consists of a catalytic reactor positioned downstream of the economizer. A $NO_x$ reducing chemical, such as ammonia or urea, is injected just prior to the reactor. SNCR directly injects the reducing chemical into the furnace or high temperature convective pass of the boiler itself. Due to the high temperature within the furnace, reasonable $NO_x$ reductions can be achieved without contact with a catalyst. SNCR injection is achieved by use of wall-type injectors or with retractable lances based on soot blower technology. Ultimately SCR achieves much higher $NO_x$ reduction than SNCR; however, SNCR has advantages over SCR that include cheaper installation cost and lower power consumption.

Mitsui Babcock has marketed a process that reduces pollutants, such as $NO_x$ and mercury, (hereinafter referred to as the "autocatalytic process") as an alternative to SCR and SNCR. Autocatalytic processes achieve the high $NO_x$ reduction associated with SCR technology but in combination with the low installation and power consumption costs associated with SNCR. Autocatalytic processes remove $NO_x$ in flue gas containing 2 to 18% $O_2$ average concentration, noting that locally $O_2$ can be much lower in a large boiler. The $NO_x$ reduction is achieved by introducing a controlled amount of hydrocarbon to "auto-catalyze" the $NO_x$ reduction process and to release heat auto-thermally for self-sustaining "autocatalytic" reactions. Reductants, such as ammonia-based reagents, are introduced as reactants and, in conjunction with the hydrocarbon, reduce $NO_x$ concentration in the flue gas. The plasma of the hydrocarbon creates the "autocatalytic" conditions.

The hydrocarbon is introduced into the flue gas using a carrier gas, such as steam. The preferred hydrocarbon is natural gas although other hydrocarbons, such as propane, have been used and found to be suitable. The amount of hydrocarbon injected into the furnace is a function of the temperature in the injection zone and will generally be 0-2% of furnace/boiler heat input. In a typical SNCR process, high temperatures are required to produce radicals that are required to form the $NH_2$ radicals from ammonia for the $NO_x$ reduction reaction. In autocatalytic processes, the auto-ignition of the hydrocarbon provides a source of these radials, and the $NO_x$ reduction reaction can occur at lower temperatures and with higher $NO_x$ reductions than normally expected with SNCR. For further details of an autocatalytic process, reference is made to U.S. Pat. No. 5,985,222, No. 6,066,303 and No. 6,348,178 to Sudduth et al which are incorporated herein by reference.

Autocatalytic processes have a number of benefits over traditional SCR and SNCR technologies. They have a lower capital cost compared with SCR technology but still achieve similarly high $NO_x$ reductions, which are much higher than the reductions associated with SNCR technology. They also avoid the problems associated with the SCR solid catalyst which include chemical poisoning, physical plugging, sintering from temperature excursions, increased pressure drop resulting in the need for new, larger induced draft fans and disposal of a hazardous waste.

U.S. Pat. No. 4,115,515 to Tenner et al, U.S. Pat. No. 4,782,771 to Bergkvist, U.S. Pat. No. 4,950,573 to Flockenhaus et al, U.S. Pat. No. 5,240,689 to Jones, U.S. Pat. No. 5,326,536 to Carter, U.S. Pat. No. 5,645,690 to Viel Lamore et al, U.S. Pat. No. 5,489,419 to Diep et al, U.S. Pat. No. 5,489,420 to Diep, U.S. Pat. No. 5,536,482 to Diep et al, U.S. Pat. No. 5,685,243 to Gohara et al, U.S. Pat. No. 5,820,838 to Tsuo et al, U.S. Pat. No. 6,190,628 B1 to Carter and U.S. Pat. No. 6,453,830 B1 to Zauderer and U.S. Patent Application Publication No. US 2002/0025285 A1 to Comparato et al are representative of the injection of chemicals into flue gases on a zonal or areal basis; however, all have the disadvantages of having injection of a single concentration of chemicals along the length of an elongate lance passing through a flue gas pass and/or having nozzles mounted on the walls of the flue pass such that chemicals cannot be precisely injected in interior zones of the flue gas pass in an efficient and cost effective manner.

SUMMARY OF THE INVENTION

One aspect of the present invention is to use a grid arrangement of injection lances to define a zonal injection matrix permitting the controlled injection of pollutant reducing chemicals to each of a plurality of zones to treat flue gas in a convective pass of a furnace.

Another aspect of the present invention is to utilize one or more zonal injection grids in the convection pass of a furnace to permit the injection of chemicals to reduce pollutants in the exhaust gas in a manner such that the convection pass is partitioned into zones, each of which can be injected with chemicals dependent upon the conditions in the zone. The present invention is particularly advantageous when used with an autocatalytic process where ammonia-based reagents and hydrocarbons are injected to reduce $NO_x$.

A further aspect of the present invention is to use lances to form a zonal injector grid arrangement for injecting pollution reducing chemicals into a flue gas where the lances are formed of concentric tubes carrying apertures, such as nozzles or drill holes, for selectively injecting various mixtures of the chemicals from different positions, corresponding to zones, along the same lance.

The present invention uses a zonal injector grid arrangement for injecting pollutant reducing chemicals in a convective pass of a furnace including an array of individual lances/injector tubes positioned in a grid-like formation. The lances/injector tubes are installed at the entry to or exit from a suitable cavity in the convective bank section of a furnace/boiler. When used with an autocatalytic process, a cavity is determined suitable if its temperature and flue gas residence time are within the autocatalytic process operational parameters. The grid extends over the full height and width of the gas pass, allowing full coverage of the flue gas path. The grid is divided into a matrix ("m" rows by "n" columns) of discrete injection zones. The lances extend the full depth of the gas pass and grouping the lances into "n" horizontal sections across the gas pass and dividing each lance into "m" vertical sections forms a matrix. Each of these zones is fed with a separate supply of ammonia-based reagent and hydrocarbon.

The cavity will not have a uniform temperature due to flue gas mass flow, and temperature, mass flow and inlet $NO_x$ concentration will vary from zone to zone. Excessive ammonia injection into zones of low temperature (resulting in low reaction rates) and mass flow (resulting in low reagent usage) can lead to ammonia slip which causes a number of problems in that ammonia reacts with sulfur oxides within the exhaust gas and forms ammonia sulfate and bisulphate compounds. The former may contribute to stack visible plume formation, whereas the latter can foul up heat transfer surfaces, e.g. air pre-heater surfaces. Also, the ammonia may attach to fly ash rendering it unfit for beneficial use, such as, e.g., by cement manufacturers as feed stock.

Autocatalytic process technology has a number of features/advantages that allow for optimal $NO_x$ reduction while limiting ammonia slip. Autocatalytic processes have a wide reaction temperature window with lower temperatures compensated for by a slight increase in hydrocarbon injection such that ammonia slip is controlled by autocatalytic processes and can be reduced without a reduction in ammonia injection quantities. The zonal injector grid arrangement of the present invention allows selective independent control of the ammonia and hydrocarbon flow rate to each of the zones. Optimal flow rates for each zone can be chosen representative of temperature, mass flow and $NO_x$ concentration within that zone.

The zonal injector grid arrangement according to the present invention increases effectiveness of systems for reducing pollutants and reduces pollutants as well as reducing slip and other inefficiencies. Ammonia-based reagents and hydrocarbon within a carrier gas, in the case of autocatalytic processes, are injected into flue gases through numerous apertures or nozzles along a plurality of lance/injector tubes in a grid arrangement. One of the advantages of the present invention is the achievement of relatively high $NO_x$ reduction in relation to installation and operating costs resulting in a very cost effective manner to reduce $NO_x$ emissions from furnace/boilers.

The present invention is generally characterized in a method for the introduction of a mixture of chemicals, such as an ammonia-based reagent or reductant and a hydrocarbon, within a carrier gas, such as steam, into individually discrete injector zonal areas in a furnace convective pass using an array of spaced lances arranged in a grid within the furnace convective pass for injection of the mixture of chemicals at composition rates that vary depending upon location of each discrete injector zone within the grid wherein the injection rate of each mixture and carrier gas is separately controlled and the composition varies depending upon the actual heat and flow rate conditions as well as the $NO_x$ concentrations within each discrete injector zone of the grid. A grid of spaced lances forms a zonal matrix in the path of the flue gases from a furnace where each lance delivers to more than one discrete injector zone varied compositions of reductant and hydrocarbon and carrier gas to the intended injector zones at varied optimal compositions which are controlled and dependent on the actual heat and flow rate conditions as well as the $NO_x$ concentrations within that particular discrete injector zone of the grid. The lances in accordance with the present invention include a plurality of apertures along the length of each lance body, and a system of conduits is disposed within each lance for delivery of each varied optimal composition of reductant and hydrocarbon within a carrier gas to the intended discrete injector zone areas along the lance, wherein every conduit for each zonal injector area of the grid is separate from conduits intended for other discrete zonal injector areas of the grid. The conduits include separate means for delivery for the reductant and hydrocarbon within the carrier gas for each injector zone which are insulated and cooled from the heat generated from the furnace exhaust gas until its arrival within the discrete injector zone of the lance for which the specific varied composition is intended. In another aspect, an individual injector lance can be used for each zone.

Other aspects and advantages of the present invention will become apparent from the following description of the preferred embodiments taken in conjunction with the accompanying drawings, wherein like parts in each of the several figures are identified by the same reference characters.

DESCRIPTION OF THE PREFERRED EMBODIMENTS

Figure 1A:
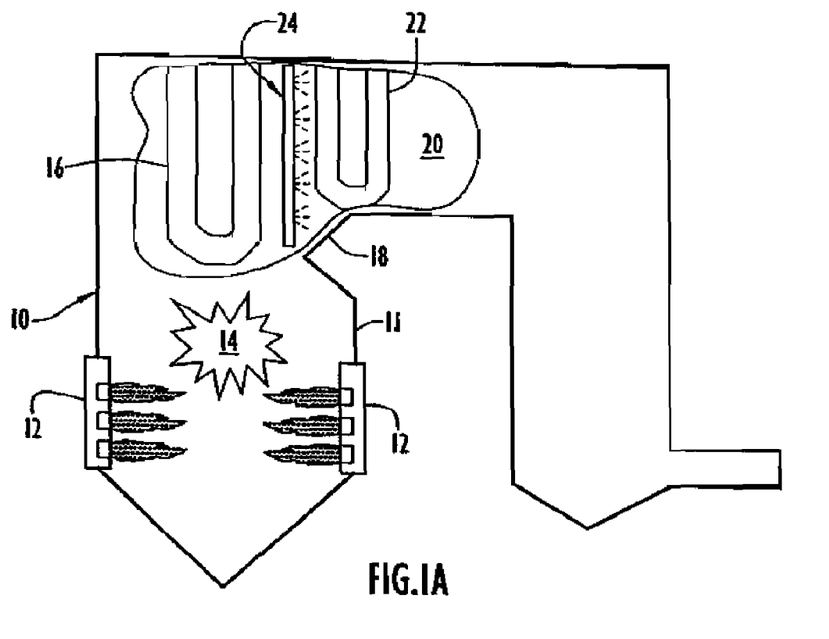
FIG. 1A is a schematic representation of the side view of a furnace with a vertically installed zonal injector grid according to the present invention.

FIG. 1A shows schematically a utility scale furnace/boiler 10 (hereinafter referred to as a furnace) incorporating a zonal injector grid arrangement according to the present invention. The furnace includes an enclosure 11 having burners 12 projecting through walls of the lower half of the enclosure 11. The burners 12 inject and ignite a supply of fuel and primary air. The combustion reaction takes place in a combustion chamber 14.

The enclosure walls carry steam generating tubes which absorb radiative heat from the combustion flame to produce steam. The heat is also utilized by radiative/convective superheater elements where steam flowing through the radiative/convective superheater elements is superheated by the hot gas products of the combustion process. The various superheater elements and heat exchanger tubes in the furnace 10 are referred to generally as heat exchangers herein. The hot gas combustion products are referred to as the exhaust or flue gas. The combustion products exit the combustion chamber 14 at boiler nose 18 and enter a water/steam duct, known as a convective pass 20. The convective pass 20 has a number of tube banks of convective heat exchangers 16 and 22. The flue gas next passes through economizers (at which the exhaust gas exits the portion of the furnace shown in FIG. 1A), which are for preheating boiler feed-water. The flue gas then passes through an air preheater for preheating the primary and secondary combustion air. Past the preheater, the flue gas enters gas cleaning equipment, e.g., a scrubber and gas solid separator. The cleaned gas is then exhausted to the atmosphere through a stack.

A zonal injector grid arrangement 24 according to the present invention is installed within the convective pass 20 to extend over the full height, i.e. top to bottom, and width, i.e. side to side thereof. The exact position of the zonal injector grid arrangement within a particular convective pass is unit specific. The zonal injector grid arrangement 24 is installed in a vertical plane between heat exchangers 16 and 22. For autocatalytic processes, a cavity must be chosen which meets autocatalytic process temperature and exhaust gas residence time operational parameters.

Figure 1B:
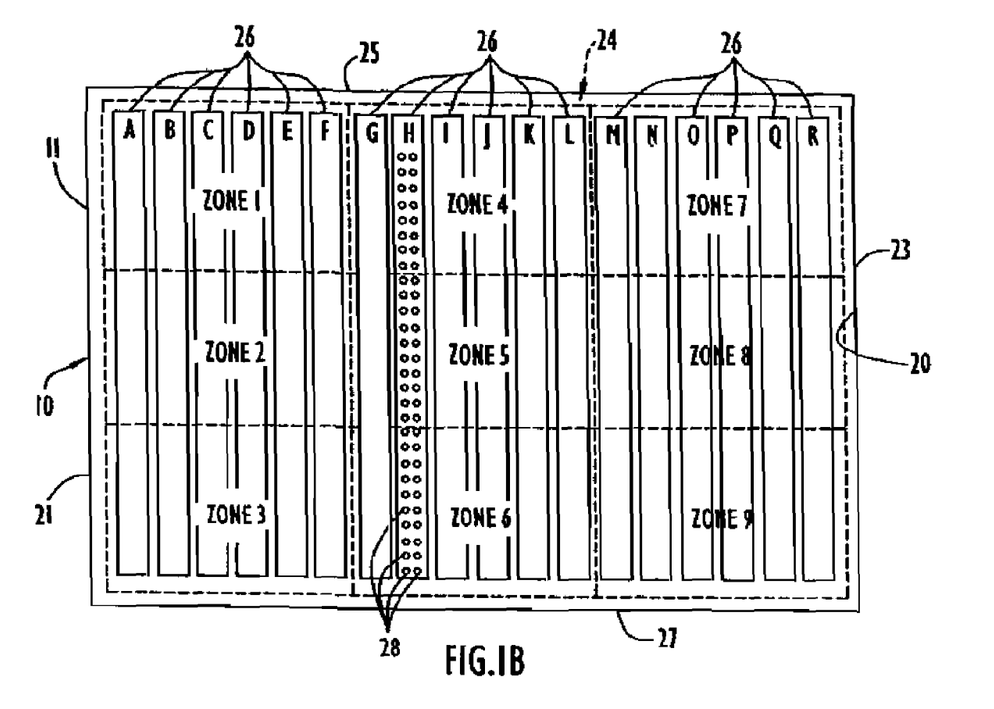
FIG. 1B is a front elevation of a 3×3 arrayed zonal injector grid made up of vertically arranged injection lances according to the present invention.

The zonal injector grid arrangement 24 contains an array of spaced injector lances or tubes 26 arranged vertically as shown in FIG. 1B but could also contain an array of spaced lances arranged horizontally if desired (not shown in FIG. 1b). The specific way in which the lances are arranged does not affect the detailed design of embodiments utilized. The arrangement used is unit specific and is based on ease of installation. Top fed vertical lances would be installed through the furnace penthouse situated above enclosure 11. Bottom fed vertical lances would be installed through the boiler nose 18. Horizontal lances would be installed through ports in the side walls or front and rear walls of enclosure 11 in a similar fashion to sootblower installations.

As shown in FIG. 1B, the convective pass 20 has vertically extending side walls 21 and 23 on opposite sides thereof to define the width of the convective pass and has a top wall 25 and a bottom wall 27 to define the height of the convective pass. For use with autocatalytic processes, each of the lances 26 is connected to a source of ammonia-based reagent (hereinafter ammonia) and a source of hydrocarbon and is fed either vertically through the penthouse situated at the top wall 25 above enclosure 11 or is bottom fed through the bottom wall 27 at the boiler nose 18. Each lance 26 has a plurality of apertures 28, such as nozzles or dill holes, spaced at intervals along the tube with each aperture ejecting a gaseous mixture of pollutant reducing chemicals into the reaction cavity in the convective pass. The number of injection lances per grid and the pitch of the apertures is unit specific and is dependant on furnace geometry and furnace flue gas flow properties.

The array of lances is split into a number of planar injection zones, with each zone having a separate supply of chemical reactants. In a typical embodiment, as represented by FIG. 1B, eighteen injection lances 26, designated A through to R, are placed in the path of the combustion gases in three sections or planar zones across a horizontal plane, with six tubes in the first section (A-F), six tubes in the second section (G-L) and six tubes in the third section (M-R). The apertures 28 in each lance are grouped vertically into three groups of ten pairs per lance/injector tube 26. The result is a 3×3 arrayed, 9 zone zonal matrix grid disposed orthogonally to flue gas flow. The number of zones, the number of grids, the number of lances per zone horizontal section and the number of apertures per lance zone vertical section are unit specific based on the exhaust gas temperature, mass flow and inlet $NO_x$ distribution across the zonal injector grid cavity utilized.

Within the zonal injector grid arrangement 24, there will be regions of relatively high temperature, mass flow and $NO_x$ concentration, which would require a high input of ammonia and low input of hydrocarbon and regions of relatively low temperature, mass flow and $NO_x$ concentration, which would require a low input of ammonia and high input of hydrocarbon. Therefore, in accordance with the present invention, chemicals are injected in such a way that the concentration thereof can be varied over a selected volume according to variations in the concentration of the chemical species to be treated.

Various embodiments of injection lance are disclosed hereinafter for use with the zonal injector grid arrangement 24. The embodiments represent designs where ammonia and hydrocarbon chemical reactants can be either premixed before entry into the injection lances or mixed only at the point of injection.

Figure 2A:
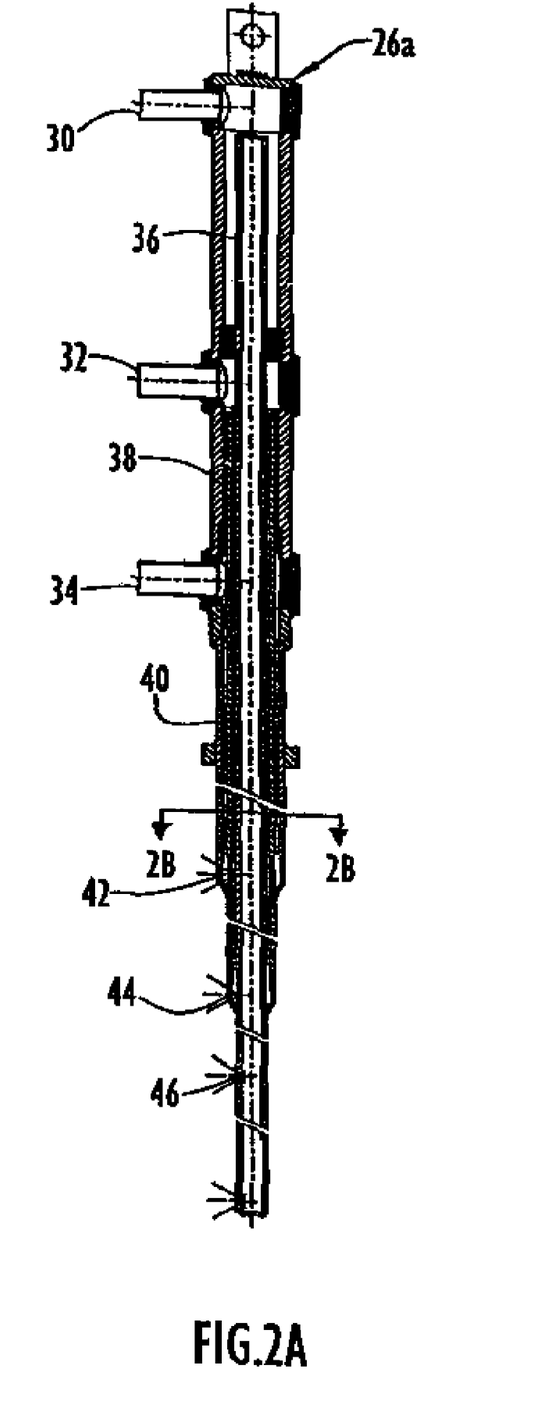
FIG. 2A is a broken section of a first embodiment of an injection lance for use with the present invention for the injection of chemicals into a convective pass cavity as used in an injection grid as shown in FIG. 1B.
Figure 2B:
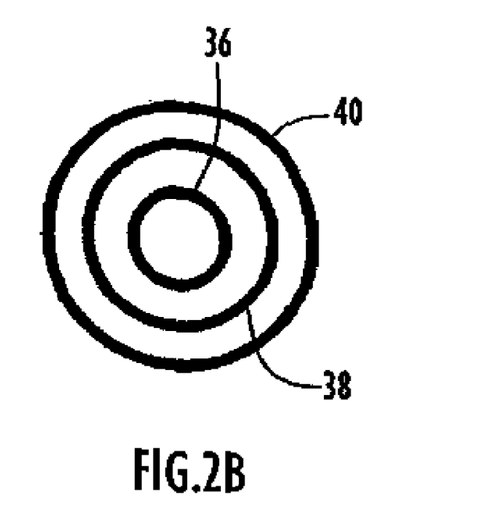
FIG. 2B is a schematic section taken along line A-A of FIG. 2A.
Figure 2C:
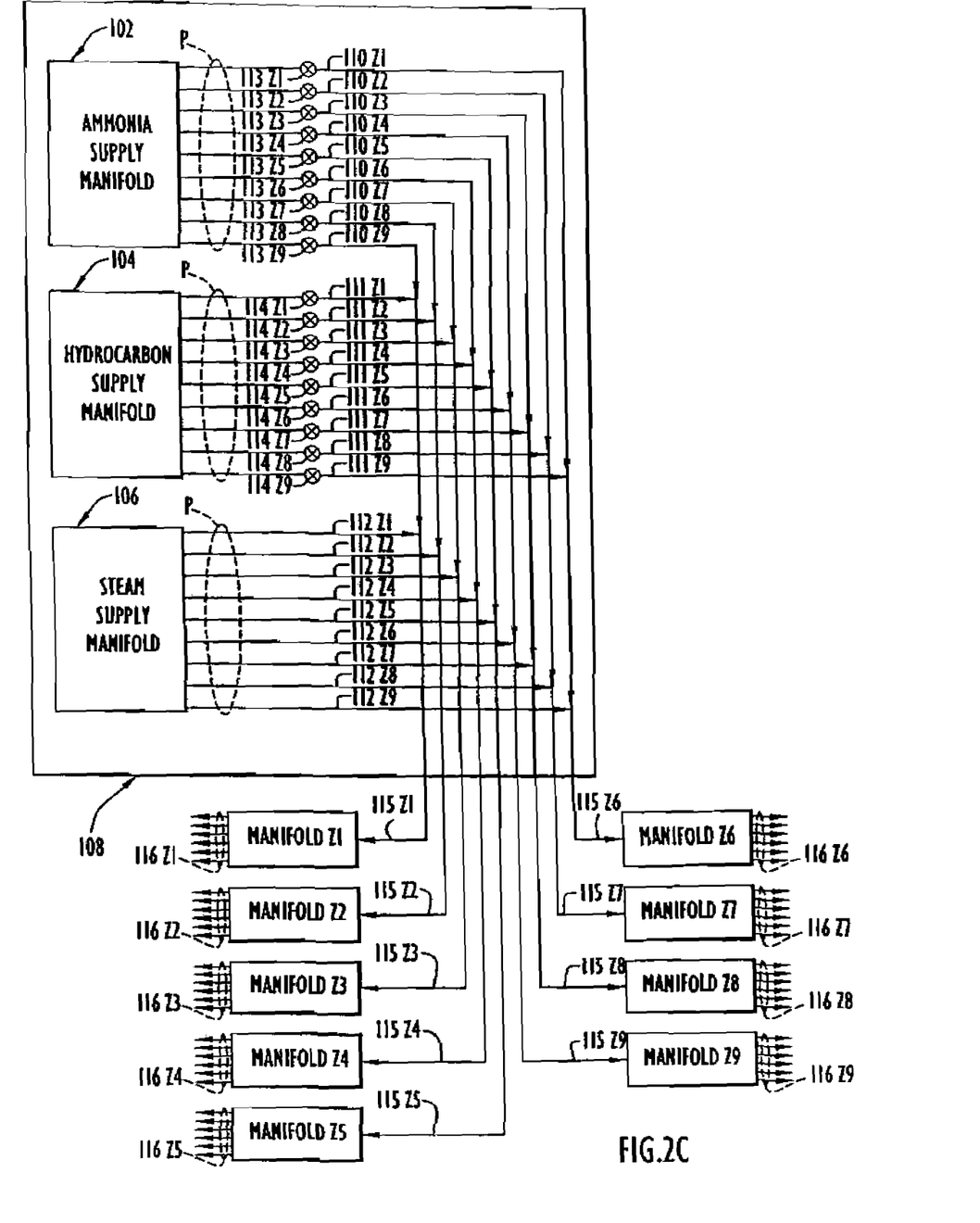
FIG. 2C is a block diagram of a manifold arrangement for use with the injection lance of FIGS. 2A and 2B.

A first embodiment, as shown in FIGS. 2A and 2B, represents a design where the zonal ammonia, hydrocarbon chemical reagents are premixed before entry into the lance. As shown in FIG. 2C, a manifold arrangement includes a series of manifolds which are utilized to supply ammonia/hydrocarbon/steam zonal streams to the grid of lances. An ammonia supply manifold 102, a hydrocarbon supply manifold 104 and a steam supply manifold 106 are all positioned in a control rack 105 preferably mounted on the roof of the furnace enclosure 11. At the control rack, the ammonia, hydrocarbon and steam supply manifolds are split p ways to form ammonia, hydrocarbon and steam zonal supply lines 110Z1-110Z9, 111Z1-111Z9 and 112Z1-112Z9, respectively, where p represents the number of zones (nine zones in the embodiment shown in FIG. 1B). Flow control valves 113Z1-113Z9 are installed in zonal ammonia supply lines 110Z1-110Z9, respectively, and flow control valves 114Z1-114Z9 are installed in zonal hydrocarbon supply lines 111Z1-111Z9, respectively. After passing through the flow control valves, the ammonia and hydrocarbon tonal supply lines mix with the zonal steam supply lines to form zonal ammonia/hydrocarbon/steam supply lines 115Z1-115Z9 which feed zonal injection manifolds Z1-Z9, respectively, i.e. one manifold for each of the nine zones. Each zonal injection manifold is split q ways where q represents the number of lances within each zone horizontal plane section of the injection grid arrangement It is noted that any number "n" of zone horizontal plane sections can be used to form the injection grid arrangement ("n" equals 3 in FIG. 1b) and can include any number of lances. Outlet lines 116Z1-116Z9 from the zonal injection manifolds make up feed supply lines to lances in the first embodiment, and there is a supply line 11b for the portion of a lance in each zone. A lance feeding three zones would hence connect to three supply lines 116. The supply of steam is required primarily as the carrying medium for the chemical reactants supplied to the lances. The steam provides sufficient bulk to add to the small quantities of chemicals so that the chemicals are evenly distributed between the large numbers of apertures needed to cover the furnace convective flue gas pass. The steam also has a cooling function and ensures that the chemical reactant temperatures do not rise too high in order to avoid ammonia and hydrocarbon dissociation problems.

A lance 26a according to a first embodiment is described assuming it is arranged as lances 26b in FIG. 1b (a vertical lance arrangement within a 3×3 matrix grid) and is top fed. FIGS. 2A and 2B show a schematic and cross-section, respectively, of lance 26a. Zonal flows of the mixed streams are supplied to each lance 26a separately from supply lines 116 at inlets 30, 32 and 34 such that inlets 30 of lances 26a in Zone 3 receive chemicals from outlet lines 116Z3 of manifold Z3, inlets 32 of lances 26a in Zone 2 receive chemical reactants from outlet lines 116Z2 of manifold Z2, inlets 34 of lances 26a in Zone 1 receive chemicals from outlet lines 116Z1 of manifold Z1. In a similar manner, the inlets of lances 26a in zones Z4-Z9 receive chemicals from respective manifolds Z4-Z9. Lances 26a are each formed of three concentric tubes 36, 38 and 40 as shown in FIG. 2b, each concentric tube carrying a zonal stream. The tubes are arranged so that the flows to Zones 3, 6, 9 are down the center tubes 36, flows to Zones 2, 5, 8 are down the annuluses between the center tubes 36 and the secondary or intermediate tubes 38 and flows to Zones 1, 4, 7 are down the annuluses between the secondary tubes 38 and the tertiary, outer tubes 40. Accordingly, the Zone 1,4,7 sections of the lances are each formed of three concentric tubes with each outer tube 40 having a number of apertures 28 formed by drill holes 42 along its length to inject the ammonia/hydrocarbon/steam stream across Zones 1, 4, 7. The outer tubes 40 terminate at the ends of Zones 1, 4, 7 where Zones 2, 5, 8 begin. The Zone 2, 5, 8 section of each lance is formed of the two concentric tubes 36 and 38. The secondary, intermediate tubes 38 have a number of apertures 28 formed by dill holes 44 along their lengths to inject the ammonia/hydrocarbon/steam stream across Zones 2, 5, 8. The secondary, intermediate tubes 38 terminate at the end of Zones 2, 5, 8 where Zones 3, 6, 9 begin. The Zone 3, 6, 9 section of each lance is formed of the single center tube 36 with a number of apertures 28 formed by drill holes 46 along their lengths to inject the ammonia/hydrocarbon/steam stream across Zones 3, 6, 9. The center tubes 36 terminate at the ends of Zones 3, 6, 9. As noted above, inlets 30 of lances 26a receive chemical streams from outlet lines 116Z3, 116Z6 and 116Z9 from injection manifolds Z3, Z6 and Z9 for dispersal in Zones 3, 6 and 9, respectively; inlets 36 of lances 26a in Zones 2, 5 and 8 receive chemical streams from outlet lines 116Z2, 116Z5 and 116Z8 from injection manifolds Z2, Z5 and Z8, for dispersal in Zones 2, 5 and 8, respectively; and inlets 34 of the lances 26a receive chemical streams from outlet lines 116Z1, 116BZ4 and 116Z7 from injection manifolds Z1, Z4 and Z7, for dispersal in Zones 1, 4 and 7, respectively. Accordingly, each of the zones receives a chemical mixture specifically designed for that zone in accordance with temperature, flow and other sensed parameters.

Depending on the unit-specific location of the lances 26a shown in FIGS. 2A and 2B, the premixing of the chemicals prior to their introduction into the lances and the concentric tube arrangement thereof can allow the lances to operate within the temperature limits associated with chemical dissociation by controlling valves 113Z1-113Z9 and 114Z1-114Z9 in accordance with temperature and flow sensed in the associated zones. If unit specific thermal models show this not to be the case, insulation layers can be utilized. Of course, insulation can be added to any of the embodiments of the present invention, as will be described in reference to the second embodiment as shown at FIG. 3B.

Figure 3A:
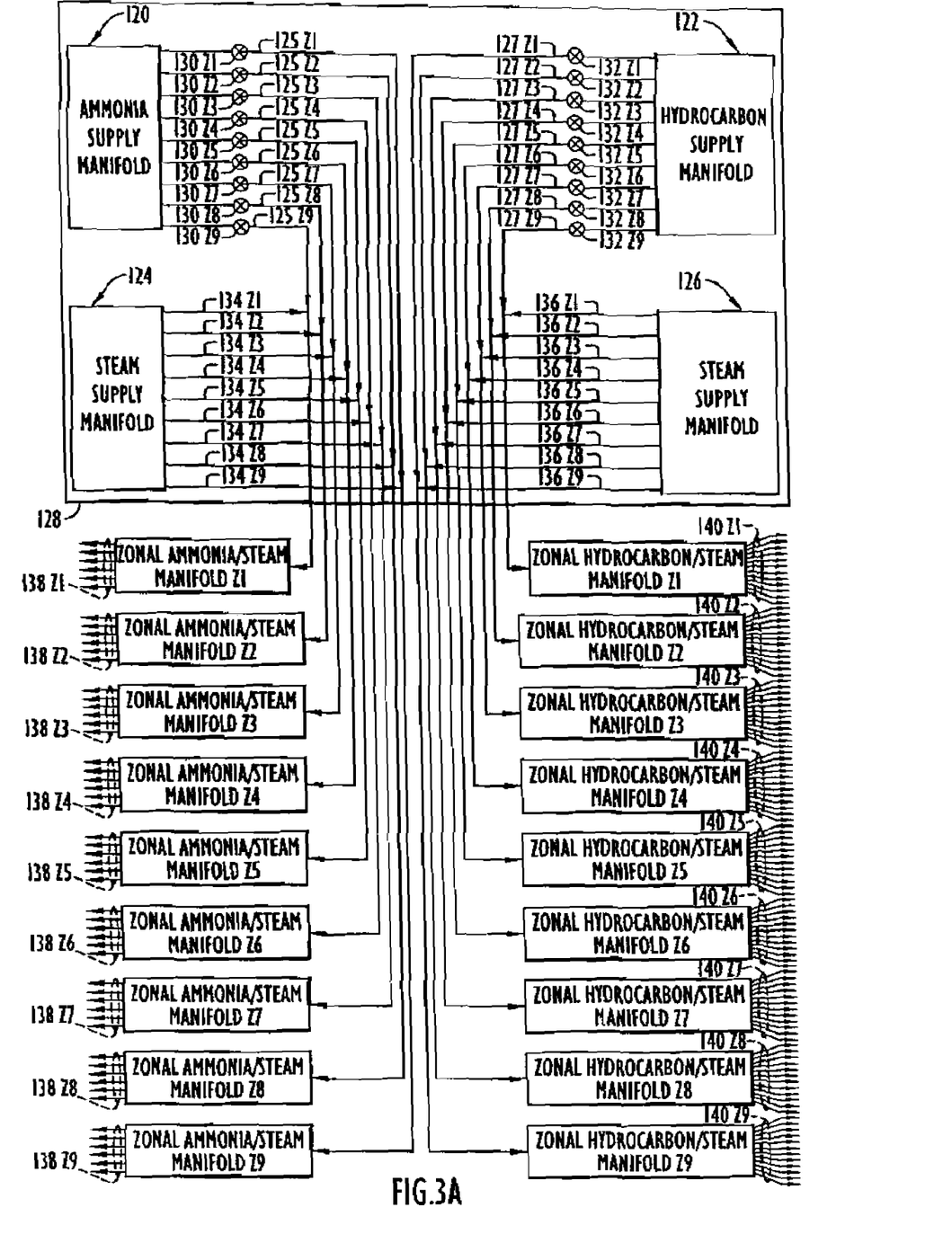
FIG. 3A is a block diagram of a manifold arrangement for use with the injection lance of FIGS. 3B, 4A, 4B and 4C.

A second embodiment of injection lances 26b for use with the present invention incorporates a design where the ammonia/steam and hydrocarbon/steam chemical reagents are supplied to, and pass through, lances 26b separately only mixing at the point of injection. As shown in FIG. 3A, a series of manifolds are utilized to supply the ammonia/steam and hydrocarbon/steam streams to a grid of lances 26b designed in accordance with the second embodiment. An ammonia supply manifold 120, a hydrocarbon supply manifold 122, a steam supply manifold 124 supplying steam for ammonia/steam mixture supply lines and a steam supply manifold 126 supplying steam for hydrocarbon/steam mixture supply lines are all positioned at a control rack 128. At the control rack, the ammonia and hydrocarbon supply manifolds are each split r ways to create the supply lines 125Z1-125Z9 and 127Z1-127Z9, respectively, where r represents the number of zones, nine in the embodiment shown in FIG. 1b. Flow control valves 130Z1-130Z9 are installed in the supply lines 125Z1-125Z9, respectively; and, flow control valves 132Z1-132Z9 are installed in supply lines 127Z1-127Z9, respectively. Each steam supply manifold is also split r ways to produce steam supply lines 134Z1-134Z9 and 136Z1-136Z9, respectively, which mix with ammonia supply lines 125Z1-125Z9 and hydrocarbon supply lines 127Z1-127Z9 directly downstream of flow control valves 130Z1-130Z9 and 132Z1-132Z9, respectively. The zonal ammonia/steam and hydrocarbon/ steam supply lines feed zonal manifolds 138Z1-138Z9 and 140Z1-140Z9, respectively. Each zonal ammonia/steam manifold is split s ways where s represents the number of lances within the zone horizontal "n"90 plane section of the injection grid. Each zonal hydrocarbon/steam manifold is split 2s ways. The subsequent lines make up the feed supply to lances 26b designed in accordance with the second embodiment. As will be appreciated hereinafter, each lance 26b receives a single ammonia/steam line and up to two hydrocarbon/steam lines per zone. A lance 26b feeding three zones will, hence, have nine reagent supply lines as well as four cooling water lines, bringing the total up to 13 per lance.

Lances 26b in accordance with a second embodiment according to the present invention will be described assuming the lances are arranged as in FIG. 1b (a vertical lance arrangement within a 3×3 matrix grid) and are bottom fed. Each lance 26b supplies three zones and is formed of three sections. FIG. 3B is a cross section of a lance 26b taken through one of the nozzles within a Zone 3, 6, 9 section of the lances. A lance zonal section includes a plurality of nozzle pair arrangements spaced along its length and houses a system of conduits that receive chemical reactants from external connections and conduct fluids along the length of the section with each nozzle arrangement in use receiving and mixing the two reactant streams before ejecting them into the furnace.

Figure 3B:
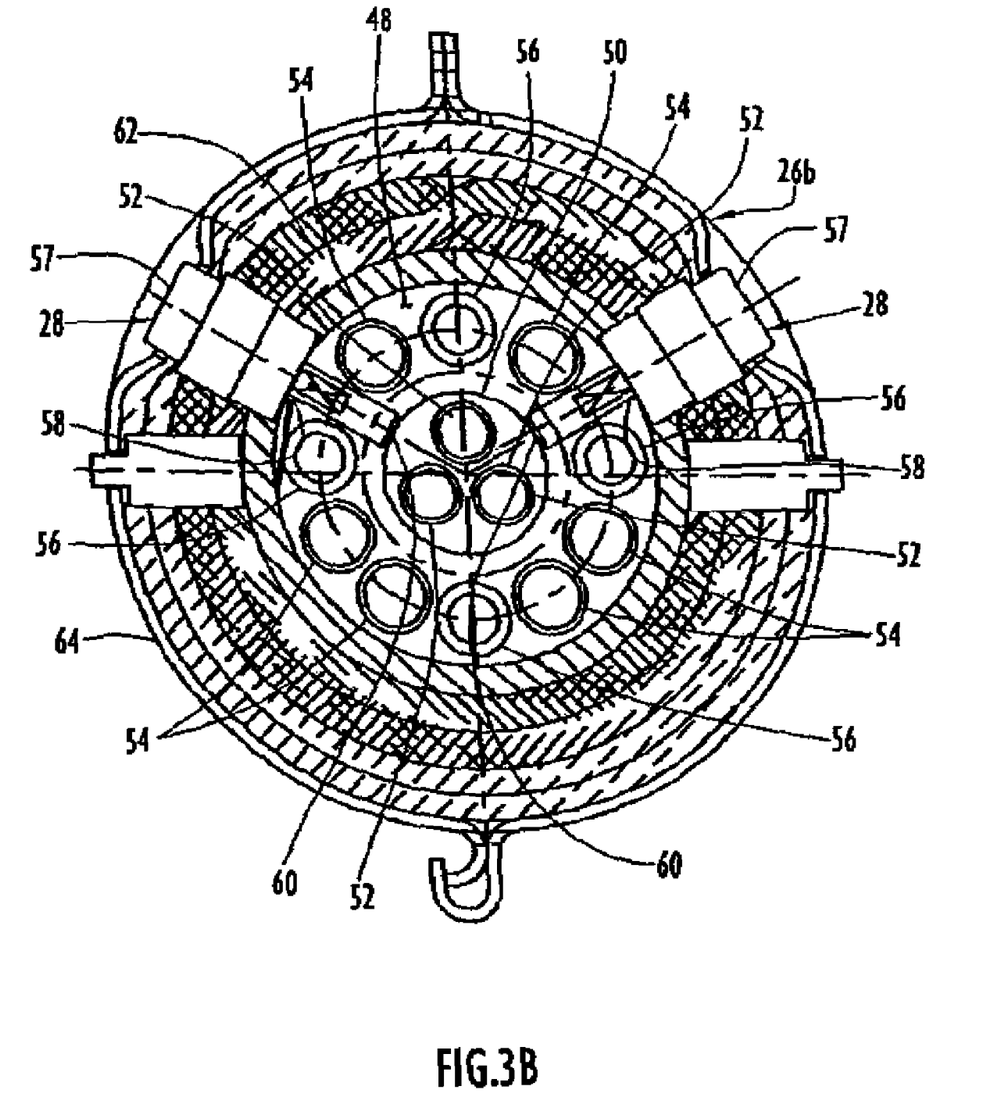
FIG. 3B is a cross-section of a second embodiment of an injection lance for use with the present invention for the injection of chemicals into a convective pass cavity as used in an injection grid as shown in FIG. 1B.

A Zone 3, 6, 9 lance section as shown in FIG. 3B includes two concentrically arranged channels formed by an outer channel 48 and an inner channel 50. Outer channel 48 has an annular cross section and inner channel 50 has a circular cross section for the particular embodiment illustrated in FIG. 3B but other channel geometries may be equally applicable. Inner channel 50 contains three conduits or tubes 52 that carry ammonia/steam. One of the ammonia/steam tubes terminates within the section to supply the zone's ammonia requirement. The remaining two tubes 52 pass through to the next zone section. Outer channel 48 contains six conduits or tubes 54 that bring hydrocarbon/steam into the lance. Two of the tubes 54 terminate within the section to supply the zonal hydrocarbon requirement. The remaining four tubes pass through to the next zone section. Channel 48 also contains a double looped cooling fluid circuit 56. A Zone 2, 5, 8 section would be similar to the Zone 3, 6, 9 section but would consist of four hydrocarbon supply tubes 54 and two ammonia supply tubes 52. A Zone 1, 4, 7 section would also be similar but with two hydrocarbon tubes 54 and one ammonia tube 52.

Lance 26b is equipped with apertures 28 in the form of nozzles 57, each of which is a two-component nozzle, i.e., each nozzle has two inlets 58 and 60 for the two components of ammonia/steam and hydrocarbon/steam. Inlets 60 are connected to or communicate with inner channel 50 such that ammonia/steam enters the nozzle through inlets 60. Inlets 58 are connected to or communicate with channel 48 such that hydrocarbon/steam is fed to the nozzle through inlets 58. Flow of the hydrocarbon/steam through the nozzles creates a vacuum at the nozzle tip which draws ammonia into conduits 52. The main purpose of the nozzles is to allow the two chemicals to mix only at the point of injection immediately downstream of the nozzle. FIG. 3B shows two nozzles 28 placed 120 degrees apart; however, nozzles can be placed all along the length of the lance. The total number of nozzles, the angle at which the nozzles are placed with respect to each other and/or the spacing between the nozzles are design parameters that will vary from application to application.

The ammonia and hydrocarbon are injected into a flue gas effluent stream that is at about 2350° F. to 900° F. Because the lances are typically made of a metal, such as steel or INCONEL®, exposing the lances to these high temperatures could result in the reagent gases inside the lance being exposed to such high temperatures, which can cause the hydrocarbon and ammonia to dissociate. Ammonia dissociates into chemical constituents which attack metal surfaces and cause embrittlement. Hydrocarbon dissociates to form carbon species which solidify and can cause potential nozzle blockages. If desired, lances 26b can be insulated and/or cooled; however, the lance 26b design can be used without insulation and/or cooling. As shown in FIG. 3B, the lance 26b can be covered with one or more layers of insulation 62. Additionally, the insulation is jacketed with a metal cladding 64. If necessary, the lance 26b can also be provided with a cooling system to cool the reactant chemicals inside the channels. In the embodiment shown, the double looped cooling fluid circuit 56 is used to cool the gases in the lance. A cooling fluid flows through the circuit to control the temperature of the chemical reagents that are to be injected. Preferably, cooling water is used as the cooling fluid but other cooling fluids are also contemplated. Examples include Dowtherm, air, hydrocarbons and aqueous solutions of organic and/or inorganic solutes. The illustrated lance cooling system is located inside outer channel 48. In other embodiments, the cooling system can be located in inner channel 60. Alternatively, both channels can contain cooling tubes. Generally, the desired cooling effect is achieved by manipulating the flow rate and/or the inlet temperature of the coolant. Other cooling systems such as direct cooling, concentric cooling tubes and the like can be used in place of the illustrated double looped cooling fluid circuit.

Figures 4A, 4C:
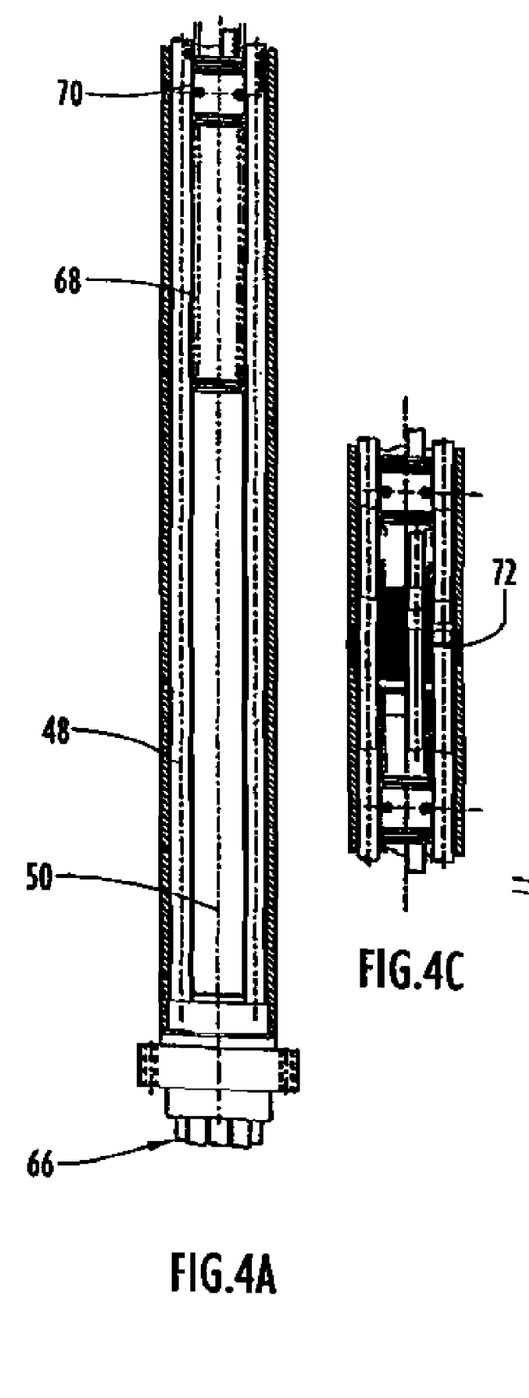
FIGS. 4A, 4B and 4C are broken sections of the body of the injection lance of FIG. 3B.
Figure 4B:
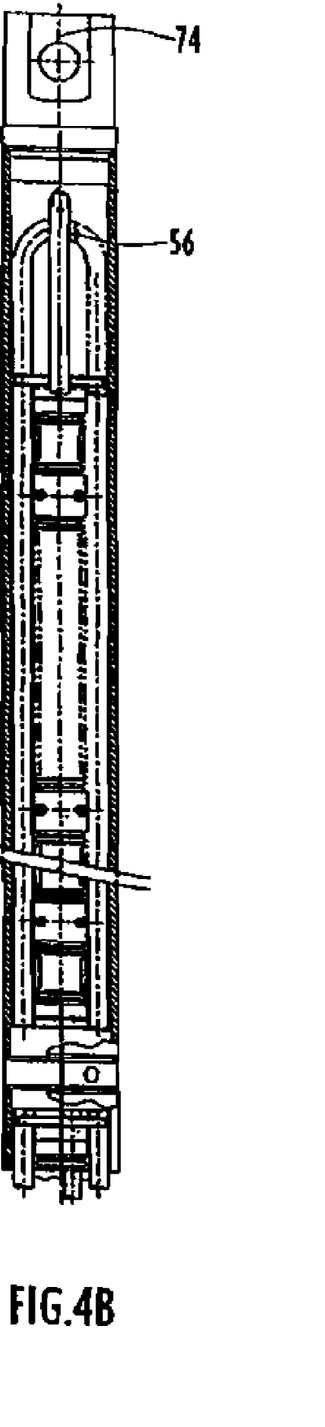

FIG. 4A shows the feed section of a lance 26b where ammonia/steam and hydrocarbon/steam mixtures from manifolds 138Z1-138Z9 and 140Z1-140Z9 are fed to lance supply conduits 66. FIG. 4B shows a zoned connector 72 that isolates the separately fed zonal flows preventing cross-zonal mixing. FIG. 4C shows the top section of lance 26b. A support lug 74 is attached to a furnace/boiler roof tube to stabilize the lance position with the injection cavity gird. The cooling water circuit double loop 56 is also more clearly shown within FIG. 4C. The inner channel 50 separates the ammonia/steam and hydrocarbon/stream mixtures within the lance itself and is made up of a series of bellows pieces 70 welded to pipe nozzle holder sections 68 (drill holes are not possible within the bellows pieces). The bellows pieces of the inner channel compensate for thermal expansion effects associated with the operational use of lances 26b.

In operation, lances 26b in Zones 1, 2 and 3 each receive ammonia/steam via supply lines from zonal ammonia/steam manifolds 138Z1, 138Z2 and 138Z3 supplied to tubes 52 at the bottoms 66 of the lances 26b such that the amount of ammonia/steam supplied to the nozzles 57 in Zones 1, 2 and 3 by valves 130Z1, 130Z2 and 130Z9, respectively. Similarly, the lances 26b in Zones 4, 5 and 6 receive ammonia/steam via supply lines from zonal ammonia/steam manifolds 138Z4, 138Z5 and the lances 26b in Zones 7, 8 and 9 receive ammonia/steam via supply lines from zonal ammonia/steam manifolds 138Z7, 138Z8 and 138Z9. Accordingly, In a similar manner, the amount of ammonia/steam supplied to the nozzles in Zones 4-9 is controlled by valves 130Z4-130Z9, respectively. Lances 26b in Zones 1, 2 and 3 each receive hydrocarbon/steam via supply lines from zonal hydrocarbon/steam manifolds 140Z1, 140Z2 and 140Z3 supplied to tubes 64 at the bottoms of 66 of the lances 26b such that the amount of hydrocarbon/steam supplied to nozzles 57 to mix with the ammonia/steam supplied thereto is controlled by valves 132Z1, 132Z2 and 132Z3, respectively. Similarly, the lances 26b in Zones 4, 5 and 6 receive hydrocarbon/steam via supply lines from zonal hydrocarbon/steam manifolds 140Z4, 140Z5 and 140Z6, and the lances 26b in Zones 7, 8 and 9 receive hydrocarbon/steam via supply lines from zonal hydrocarbon/steam manifolds 140Z7, 140Z8 and 140Z9, respectively. Accordingly, in a similar manner, the amount of hydrocarbon/steam supplied to the nozzles in Zones 4-9 is controlled by valves 132Z4-132Z9, respectively.

Figures 5A, 5B:
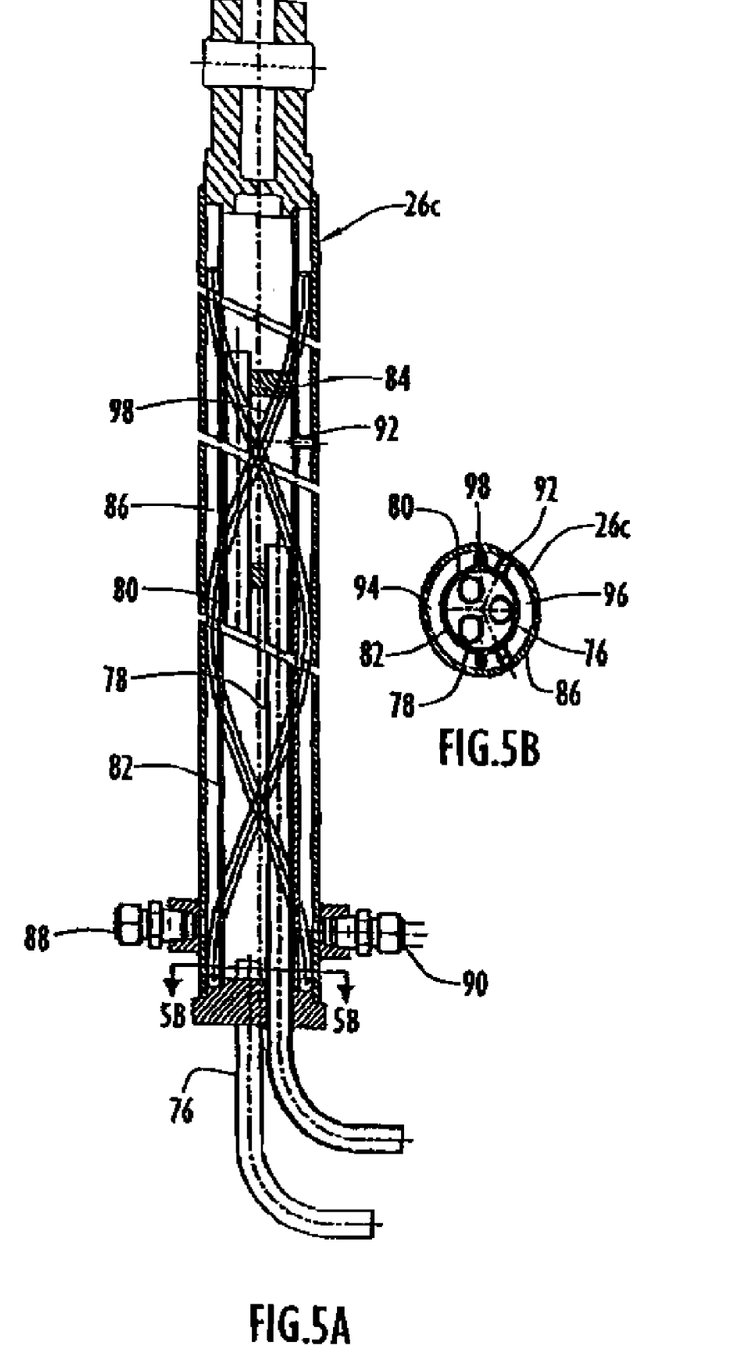
FIG. 5A is a broken section of a third embodiment of an injection lance for use with the present invention for the injection of chemicals into a convective pass cavity as used in an injection grid as shown in FIG. 1B.
FIG. 5B is a section taken along line 5B-5B of FIG. 5A.

A lance 26c in accordance with a third embodiment according to the present invention for the injection of chemicals into the convective pass of a utility boiler is shown in FIGS. 5A and 5B. Ammonia, hydrocarbon and steam are premixed before delivery to the lances 26c utilizing a control rack and zonal injection manifold arrangement as shown in FIG. 2C. The lances 26c are arranged as shown in FIG. 1B (a vertical lance arrangement within a 3×3 matrix grid) and are bottom fed. Mixed zonal flows are delivered through three conduits 76, 78 and 80 into a central feed tube 82. Zone separators 84 prevent cross-zonal mixing. A cooling water jacket 86 is disposed around the central feed tube 82. The cooling water lance supply is supplied at inlet 88 and exits at outlet 90. A plurality of apertures in the form of nozzles 92, are distributed along central feed tube 82 and protrude through the water jacket 86 to inject the ammonia/hydrocarbon/steam mixture into the exhaust gases. The cooling water jacket 86 is split into two sections, a supply/return section 94 and a supply/return section 96. Helical divider bars 98 separate the sections and create a uniform temperature distribution across the lance 26c.

In operation, cooling water enters the lance at 88 such that the nozzles 92 directly after supply 88 are supplied with cooling water through supply/return sections 94. Supply/return sections 96 act as the cooling water return sections of the jacket 88. The cooling water return passes through supply/return sections 96 before exiting through lance cooling water outlet 90. The helical nature of the divider bar 98 results in the next set of nozzles having supply/return section 96 as the supply section and supply/return section 94 as the return section. The number of nozzle sections per helical pass is unit specific.

Figure 6:
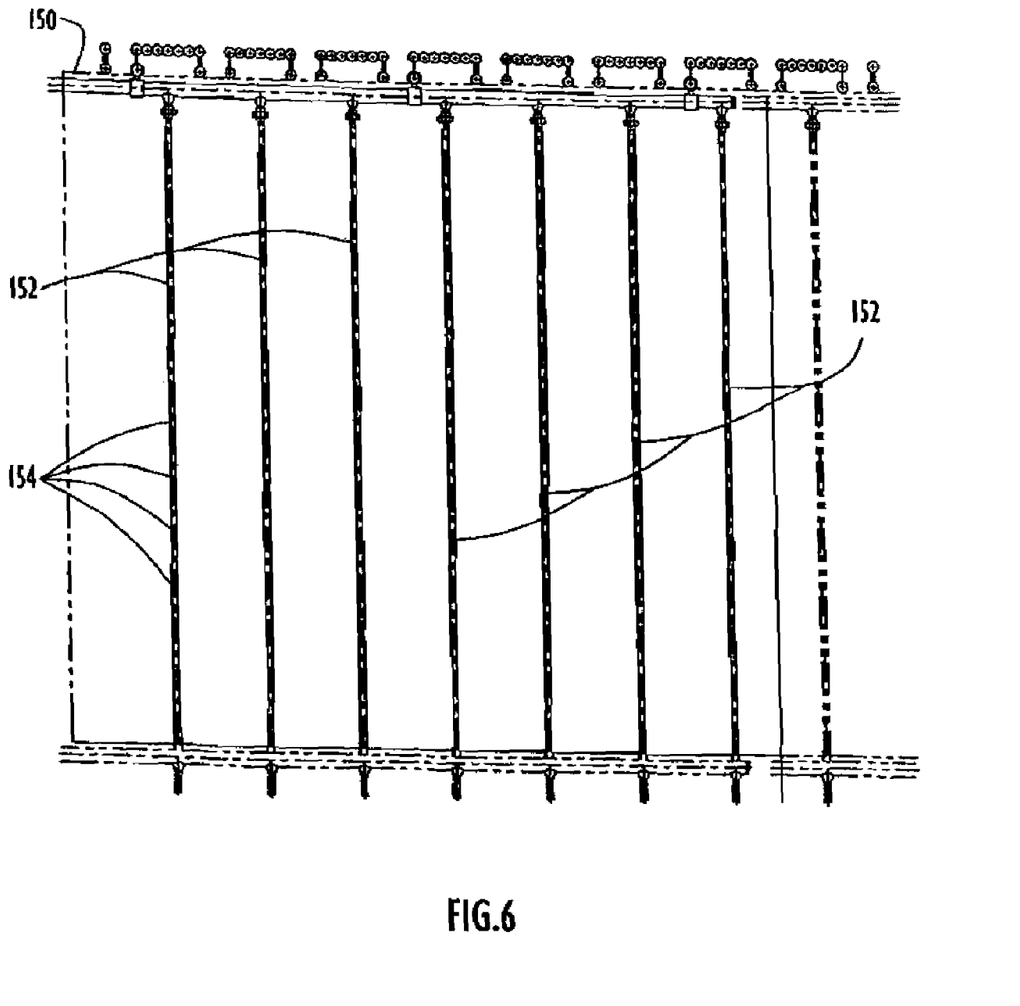
FIG. 6 is a pictorial view of a fourth embodiment of injection lances for use with the present invention for the injection of ammonia and hydrocarbon into a convective pass cavity as used in an injection grid as shown in FIG. 1B.

FIG. 6 shows a fourth embodiment for the injection of chemicals into the convective pass of a furnace in accordance with the present invention. Ammonia, hydrocarbon and steam are premixed before delivery to the injection device/lances with a control rack and zonal injection manifold arrangement installed within the convective pass itself through the boiler side wall. More particularly, a zonal injection manifold 150 vertically feeds an array of spaced injection tubes 152 with a number of apertures in the form of pitched injection holes 154 drilled along the length of each tube. A zonal injector grid is shown with seven injection tubes 152 and eleven drill hole pitches 164 per injector tube. The number of injection tubes per zone and the pitch of the drilled holes is unit specific and is dependant on boiler geometry and boiler exhaust gas flow properties. Due to the high temperatures experienced within the convective pass (900-2050° F.), the injection manifolds should be insulated while the injection tubes can remain bare. It is very likely that the injection tubes will be subject to temperatures greater than the ammonia and hydrocarbon dissociation limits; however, the main purpose of the design is to provide a cost effective injection system that can be installed for a short, specific period of time and then easily removed.

Autocatalytic processes as implemented in accordance with the present invention require a specific flow combination of ammonia-based reagent and hydrocarbon in a flue gas temperature window from 900° F. to 2050° F. in order to achieve optimal $NO_x$ destruction with minimal ammonia ($NH_3$) slip. As the boiler flue gas temperature and flow rate profile in the upper furnace is a constantly changing dynamic, the need to continuously adjust the injection flow rates is critical. As described above, both ammonia-based reagent and hydrocarbon streams are separately controlled using zonal related control valves. The combination of the two streams will vary from 0 to 100% depending on the specific process condition at any particular time. The overall $NO_x$, reduction for the boiler will be a sum of the reductions in all the zones in the system.

Figure 7:
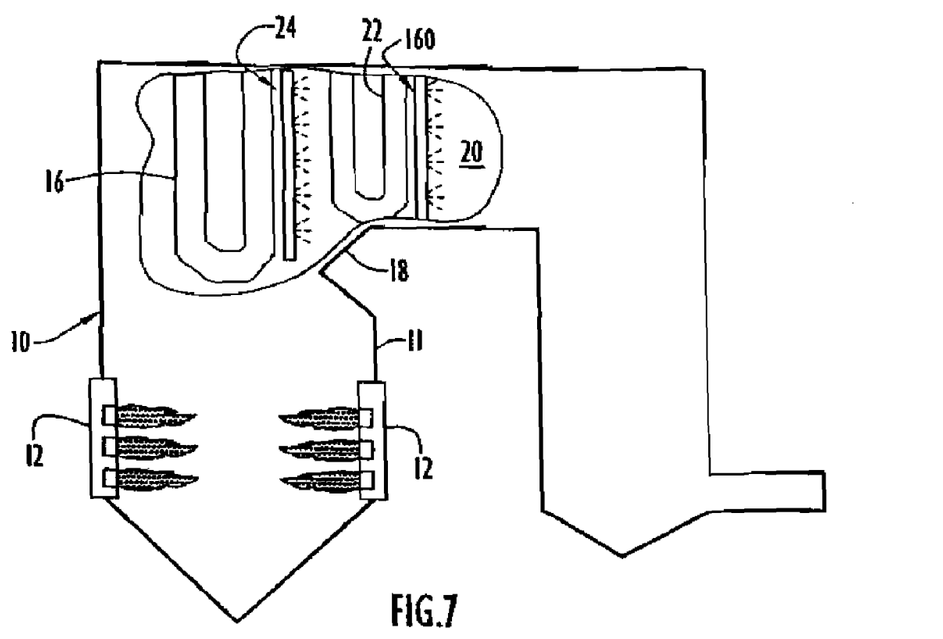
FIG. 7 is a schematic representation of the side view of a furnace with multiple vertically installed zonal injector grids according to the present invention.
Figure 8:
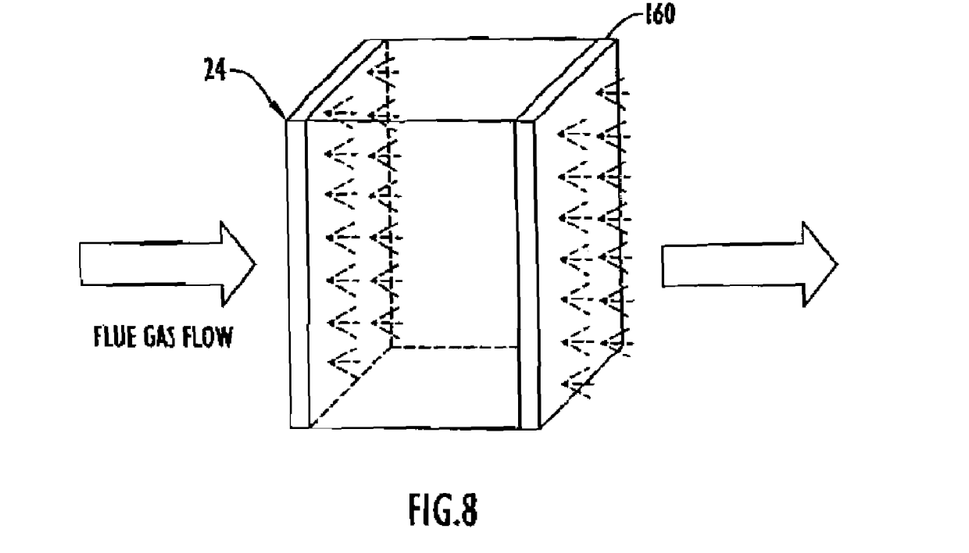
FIG. 8 is a schematic representation of the side view of a furnace with multiple vertically installed zonal injector grids according to the present invention.

In another embodiment of the present invention, a three-dimensional lance grid array arrangement is used such that two or more grids of lances in parallel planes are installed at different upper furnace locations within a 900° F. to 2050° F. process temperature window as shown in FIGS. 7 and 8 where the furnace 10 has a first zonal injector grid arrangement 24 installed downstream of convective heat exchanger 16, as described above, and a second zonal injector grid arrangement 160 installed downstream of convective heat exchanger 22. The zonal injector grid arrangements can each be constructed of lance (tube) designs, such as those described in connection with the embodiments of FIGS. 2A and 2B, FIGS. 3, 4A, 4B and FIG. 4C, FIG. 5 and/or FIG. 6.

The three-dimensional lance grid arrangement is particularly advantageous since the flue gas temperature distribution and the flow distribution and direction across lance grid planes can vary significantly from day to day depending on a number of operating parameters such as load rating, specific fuel type, burner and combustion air settings, excess $O_2$ rate and the like. Complete mixing of reagent with the non-homogeneous flue gas stream is a three dimensional complexity that varies with time, and using multiple grids in a three dimensional arrangement there will be improved mixing of the injected reagent with the entire flue gas volume resulting in more complete $NO_x$, reduction and lower $NH_3$ slip.

Figure 9:
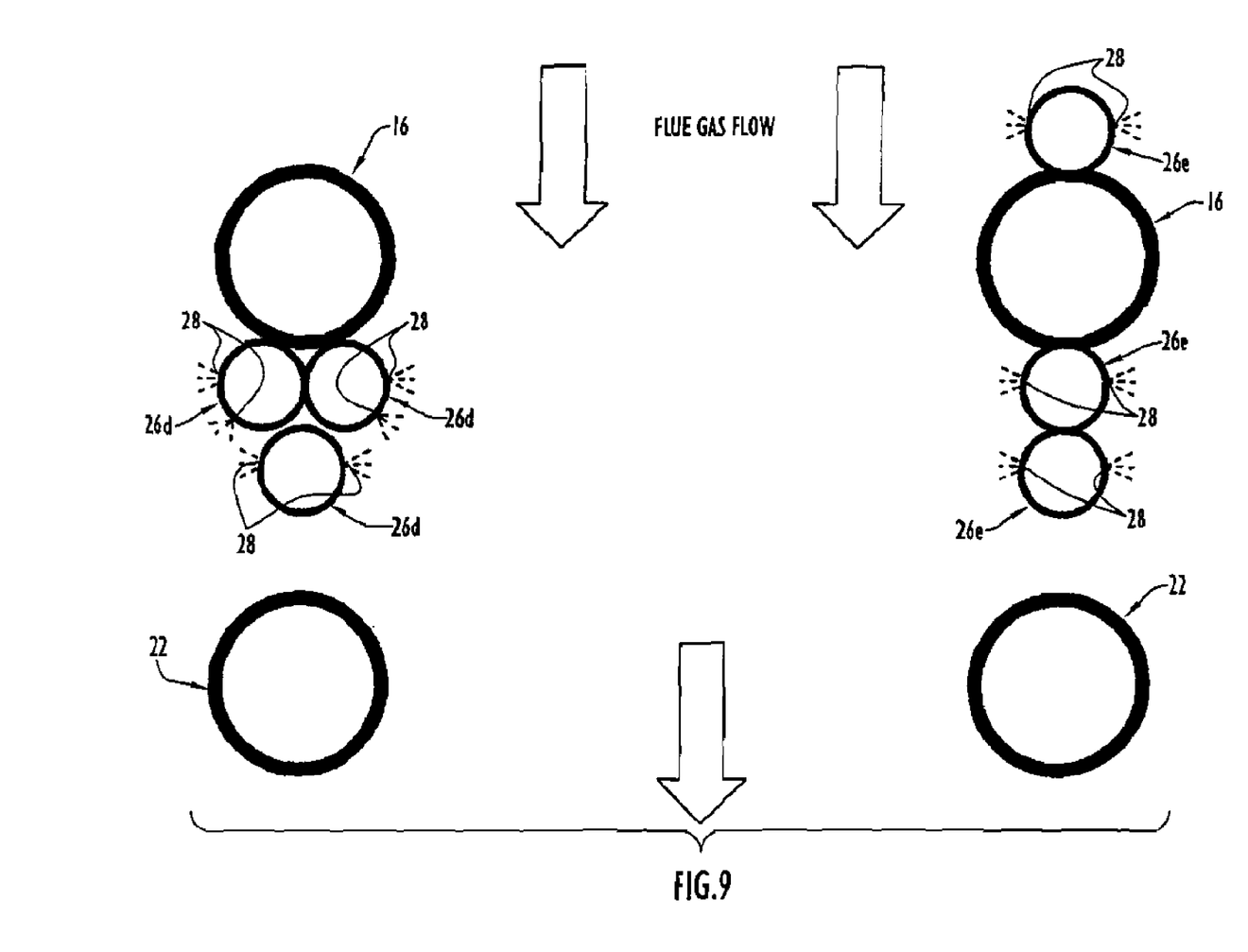
FIG. 9 is a simplified perspective view of the zonal injector grid arrangement of FIG. 6.

A further embodiment for providing zonal injection in accordance with the present invention utilizes a dedicated lance for each vertical zone. For each location across the heat exchanger bank, a dedicated lance is routed to each vertical zone. The lance is formed of a single, small diameter pipe that has apertures in the form of nozzles located at a specific zone. The lances are clamped to the adjacent heat exchanger along its length. The spacing of the lance grid can match the transverse spacing of the heat exchanger assemblies or can be a multiple thereof. FIG. 9 schematically shows a first such dedicated lance arrangement on the left and a second such dedicated lance arrangement on the right. On the left, three small diameter lances 26d are attached either directly or indirectly to heat exchanger tube 16 in a cluster such that the lances 26d are not longitudinally arranged with the flue gas flow. On the right, lances 26e are attached either directly or indirectly to heat exchanger tube 16 in a longitudinal arrangement parallel to the flue gas flow. The lances 26d and 26e have apertures 28, in the form of nozzles, along the lengths thereof. As explained with respect to the three-dimensional embodiment, the lances 26d and 26e can also be attached to the heat exchanger tubes 22.

Preferably, the lances will be fabricated from a high alloy metal, such as INCONEL® alloy 601, that will withstand oxidation up to full flue gas temperature (maximum 2350° F.). Accordingly, since the lance material can withstand temperatures as high as 2350° F., the need for cooling is minimized. The lance temperature will desirably be kept below the slagging temperature of the fly ash to prevent plugging of the injection nozzles. This temperature is normally in excess of 2000° F., depending on the particular coal ash composition. A purge flow of steam, air or other medium will be required when the autocatalytic process is not in service in order to keep the nozzles free of ash.

An autocatalytic process in accordance with the present invention operates in a wide flue gas temperature window of 2050° F. to 900° F. The injection lance grids are strategically located in the upper furnace gas pass, normally within heat exchanger, e.g. superheater/reheater, tube banks. The typical operating flue gas temperatures in the lance grid regions(s) will vary anywhere from 2350® F. to 900° F. depending on many factors, such as boiler operating load (which may vary daily for peaking units and seasonally for other generating units), fuel characteristics, relative fouling of heat transfer surfaces upstream of the grid(s), temperature profile across the grid plane and operational set-up of the combustion system.

The lances can have varying diameter apertures/nozzles along the total in-furnace length of the lances to inject a pre-calculated distribution of reagent flow along the overall length of the convective pass. More specifically, in order to accomplish a specific flow rate of reagent in each of the dedicated planar zones formed by the grids, the aperture/nozzle diameters are sized to match the flue gas conditions expected at the particular locations of the apertures/nozzles. In this manner, a single lance tube could replace three lances for a three zone vertical grid design and also reduce the number of feed lines, mixing stations and control valves by a factor of three.

The present invention is described herein for use with an autocatalytic process for reduction of pollutants, particularly $NO_x$, in flue gases; however, it will be appreciated that the design and arrangement of the zonal injection grid and lances can also be used to independent inject chemicals other than ammonia and hydrocarbon into planar zones in a convection pass of a furnace.

Inasmuch as the present invention is subject to many variations, modifications and changes in detail, it is intended that all subject matter discussed above or shown in the accompanying drawings be interpreted as illustrative only and not be taken in a limiting sense.

The invention claimed is:

1. A method of reducing pollutants in flue gases from a furnace having a convection pass comprising the steps of
    installing an injector grid arrangement in the convective pass to define a plurality of planar zones formed of lances having apertures for injecting reagents into the flue gases;
    providing chemicals for reducing pollutants in the flue gas;
    supplying the chemicals to the injector grid arrangement;
    controlling the chemicals supplied to the injector grid arrangement to cause each of the zones to receive a controlled amount of the chemicals depending upon conditions in that zone to reduce pollutants in the flue gases,
    said chemicals providing step including providing an ammonia-based reagent and a hydrocarbon.

2. A method as recited in claim 1 wherein said chemicals supplying step includes supplying a mixture of ammonia-based reagent and hydrocarbon to the injector grid arrangement 3. A method as recited in claim 1 wherein said chemicals supplying step includes supplying the ammonia-based reagent and the hydrocarbon separately to the injector grid arrangement and mixing the ammonia-based reagent and the hydrocarbon in the injector grid arrangement.

4. A method as recited in claim 1 wherein said chemicals supplying step includes using steam as a carrier for the ammonia-based reagent and the hydrocarbon.

* * * * *